May 21, 1946. K. F. GALLIMORE ET AL 2,400,819
MACHINE TOOL
Filed July 14, 1943 11 Sheets-Sheet 1

INVENTORS
Keith F. Gallimore
Hans B. Straut
By Parker, Carlson, Pitzner & Hubbard
ATTORNEYS

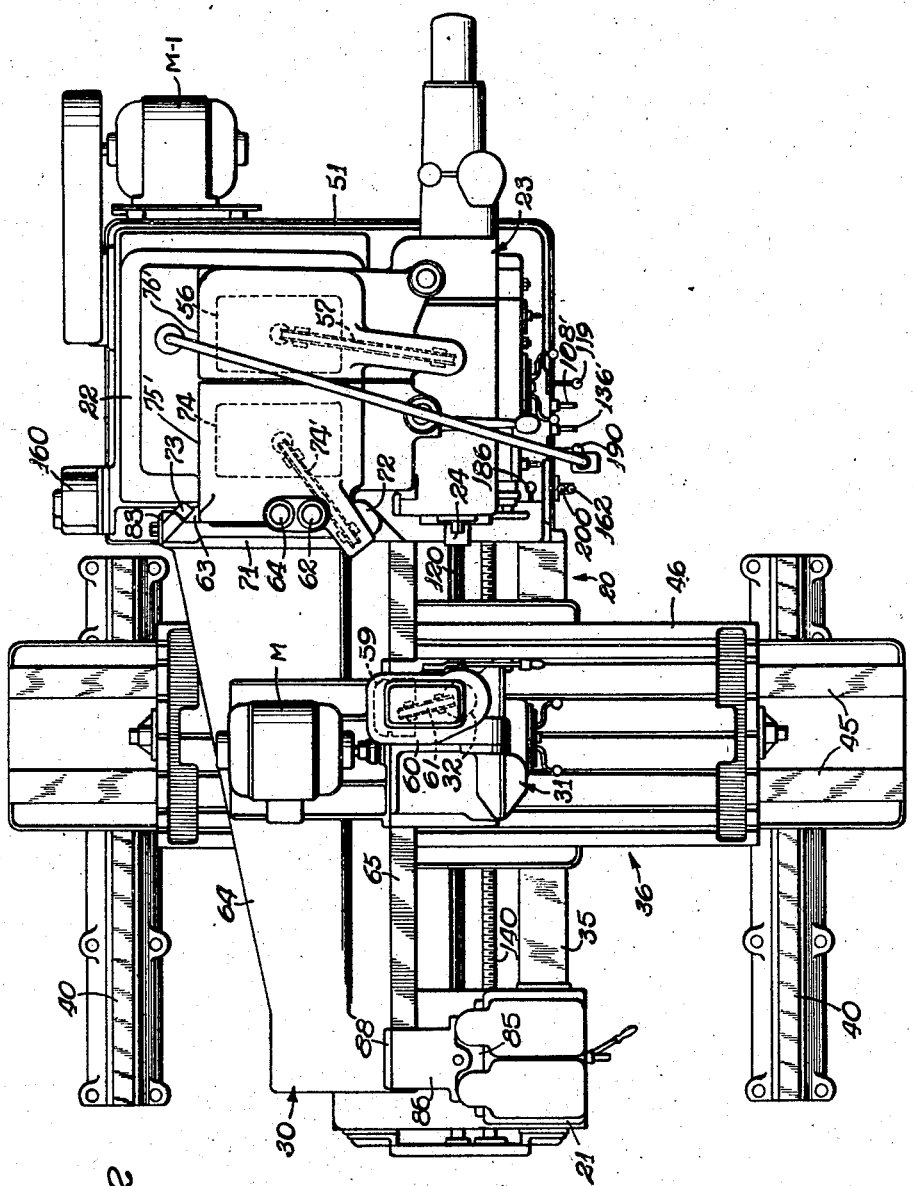

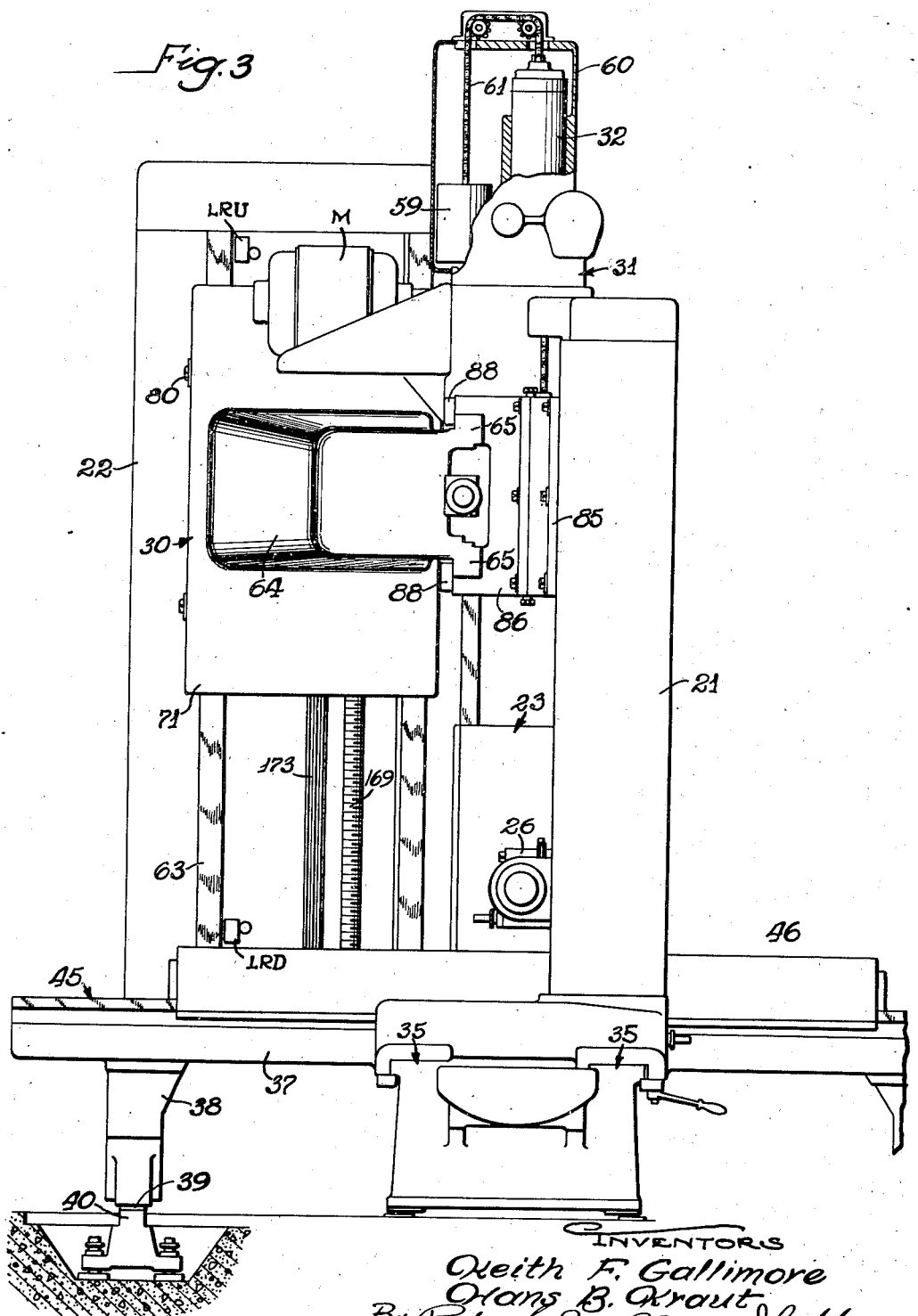

May 21, 1946.  K. F. GALLIMORE ET AL  2,400,819
MACHINE TOOL
Filed July 14, 1943  11 Sheets-Sheet 4
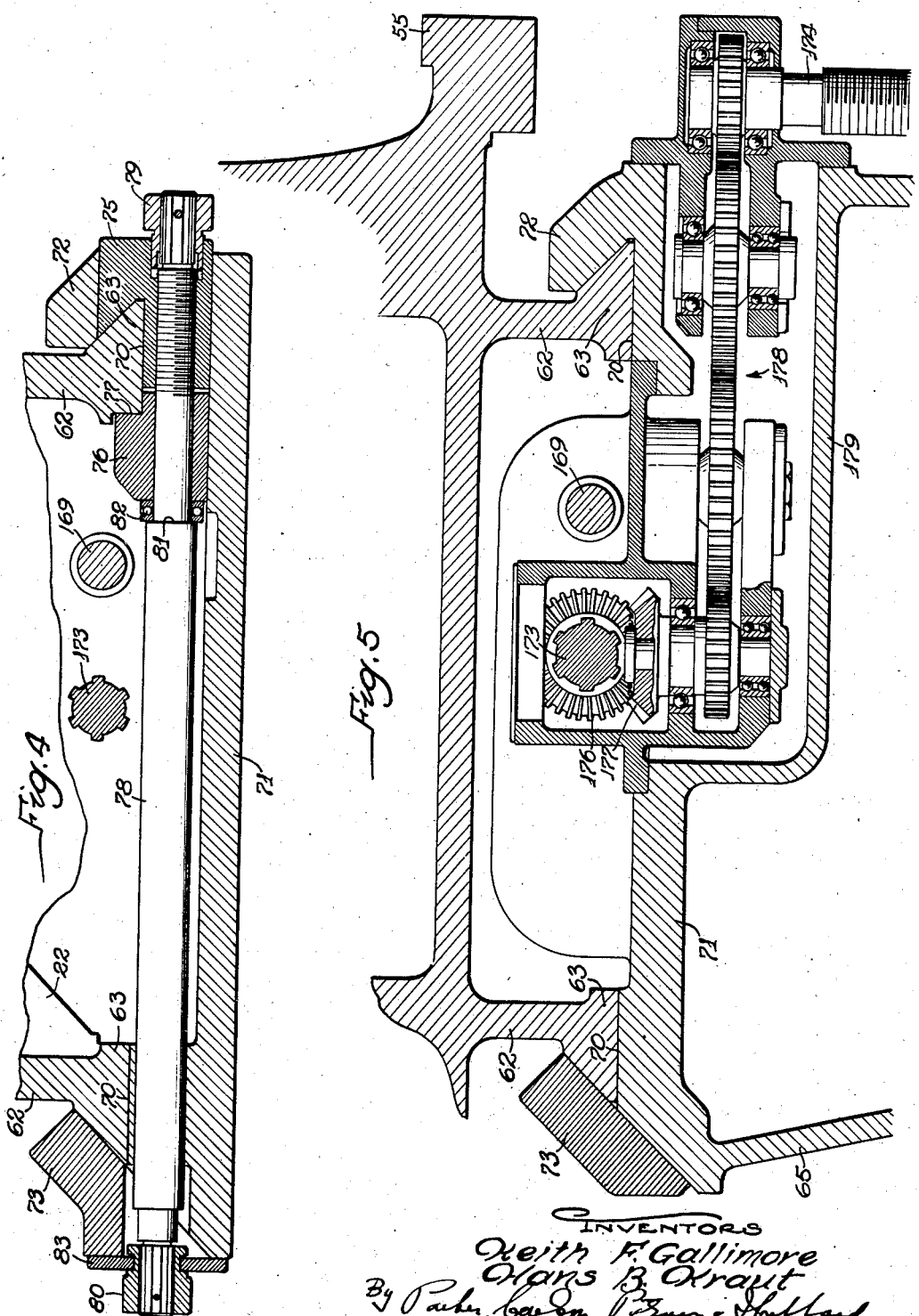

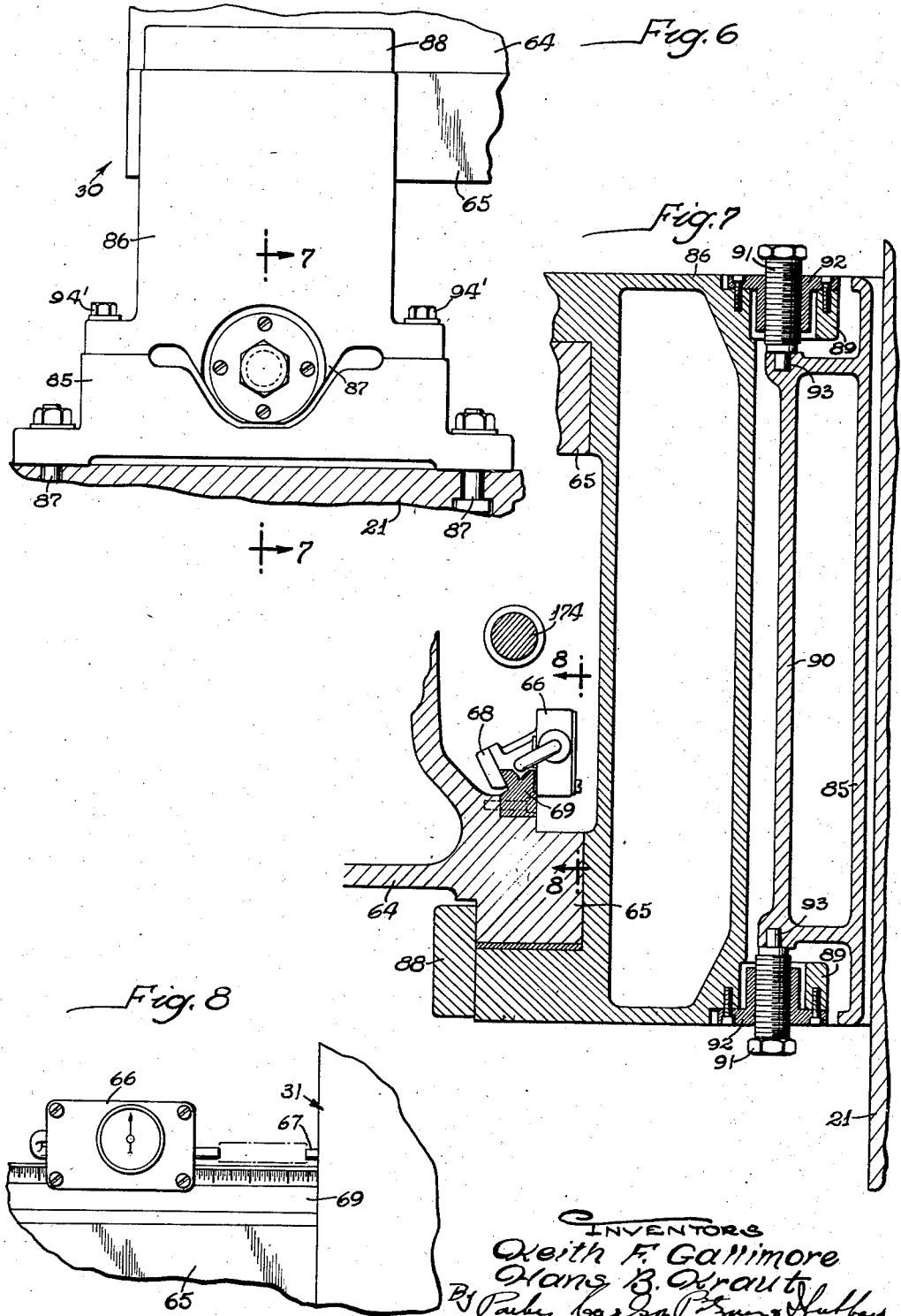

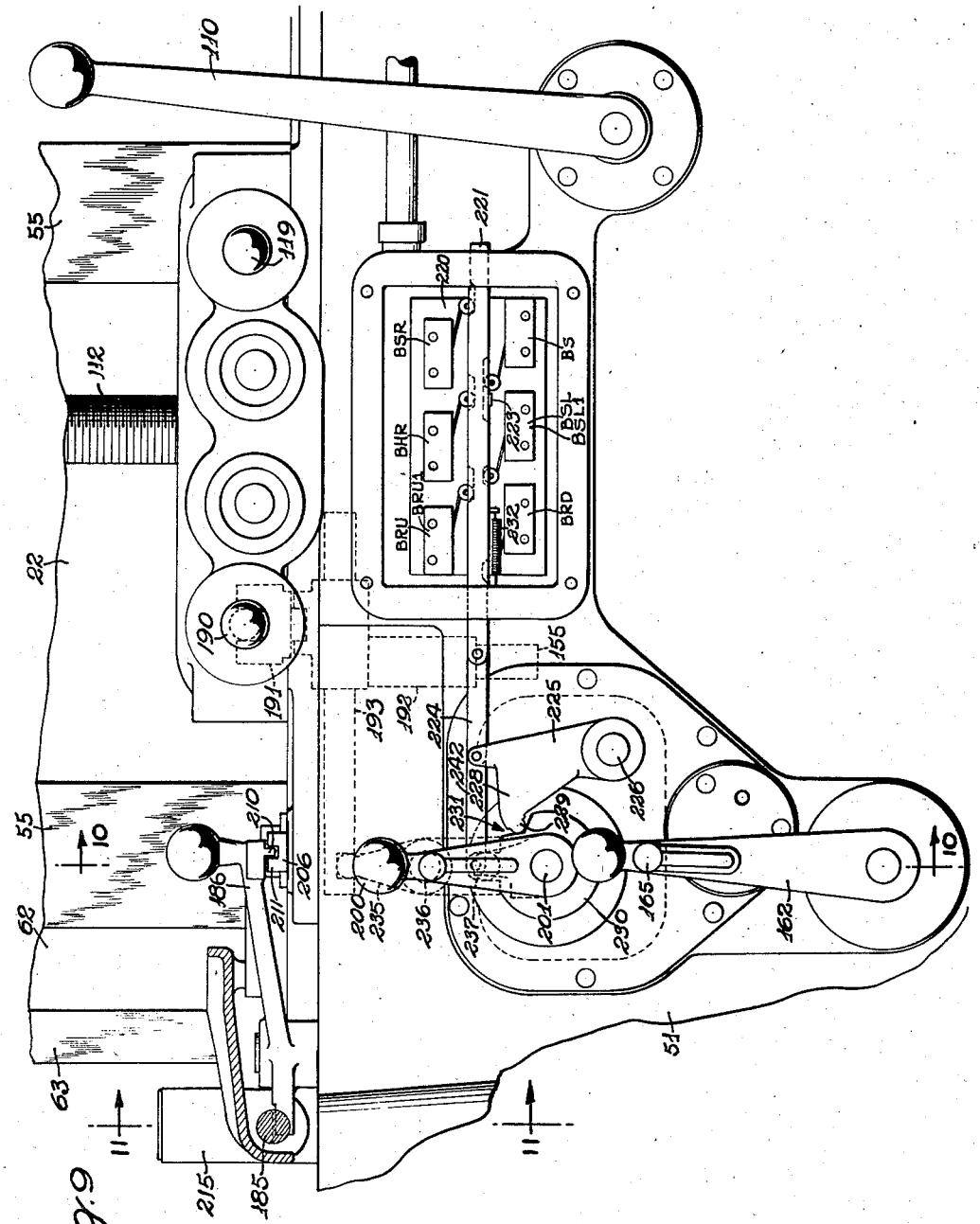

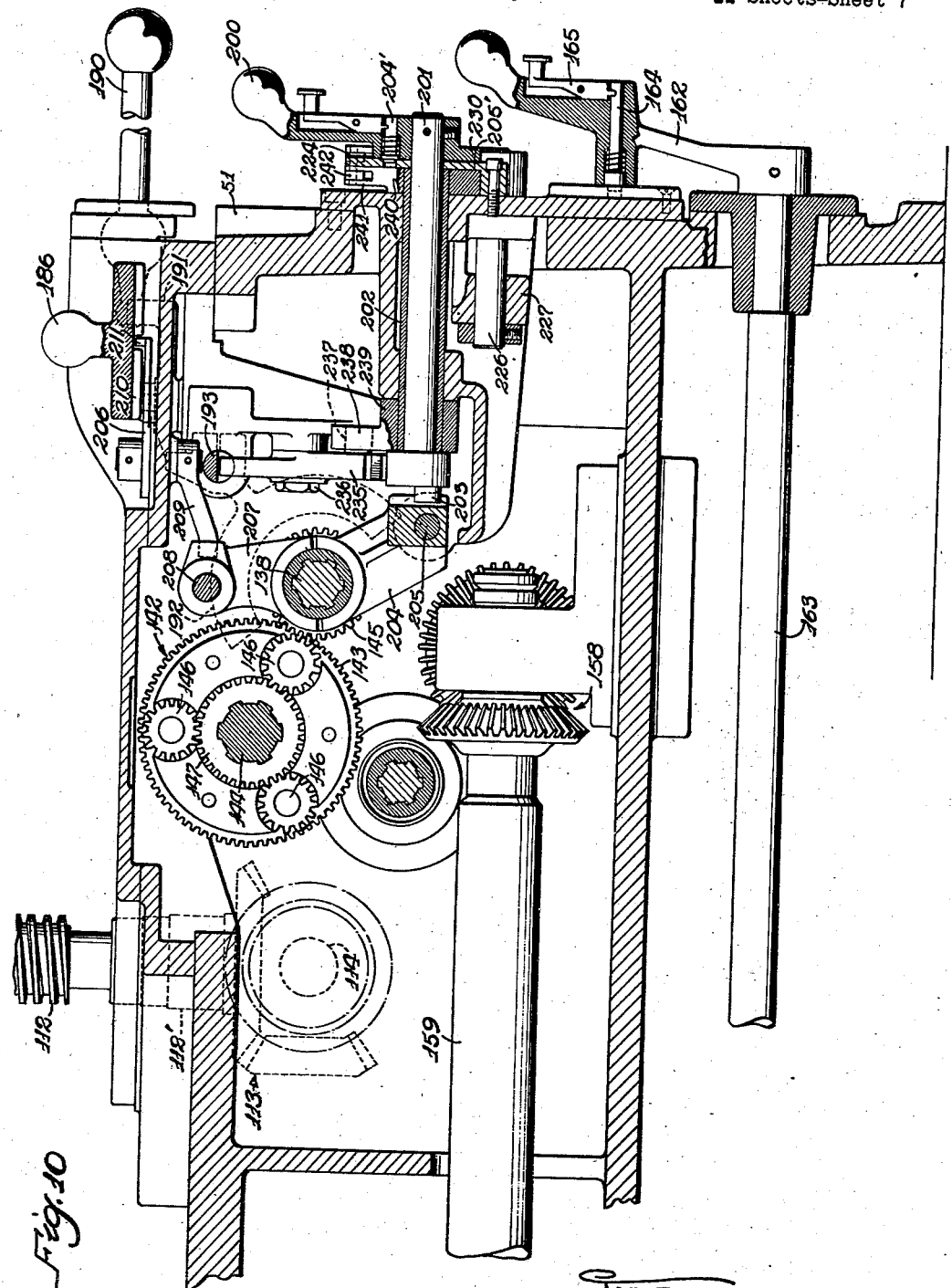

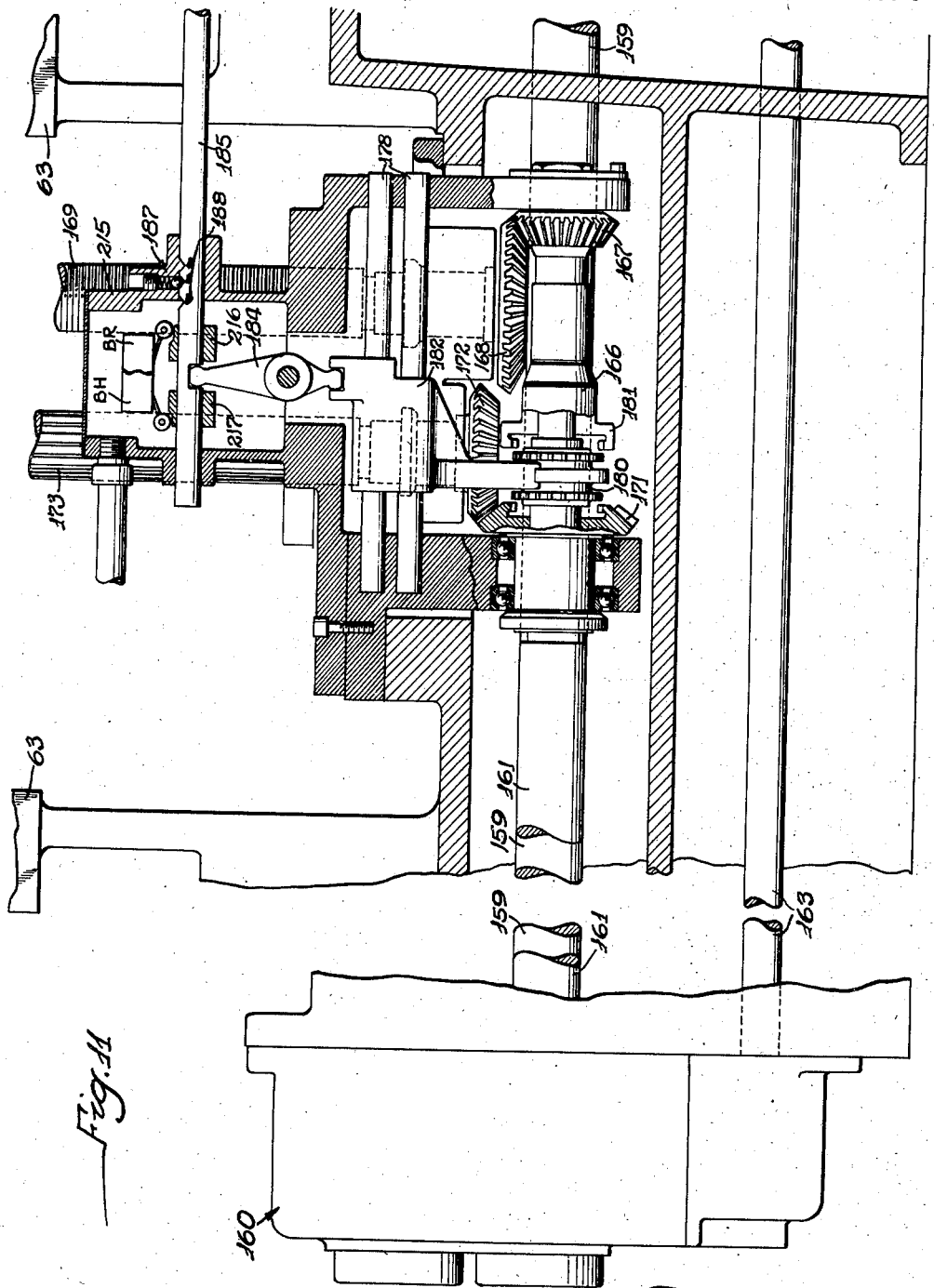

May 21, 1946.　　K. F. GALLIMORE ET AL　　2,400,819
MACHINE TOOL
Filed July 14, 1943　　11 Sheets-Sheet 10

Fig. 13

Inventors
Keith F. Gallimore
Hans B. Ovraut
Attorneys

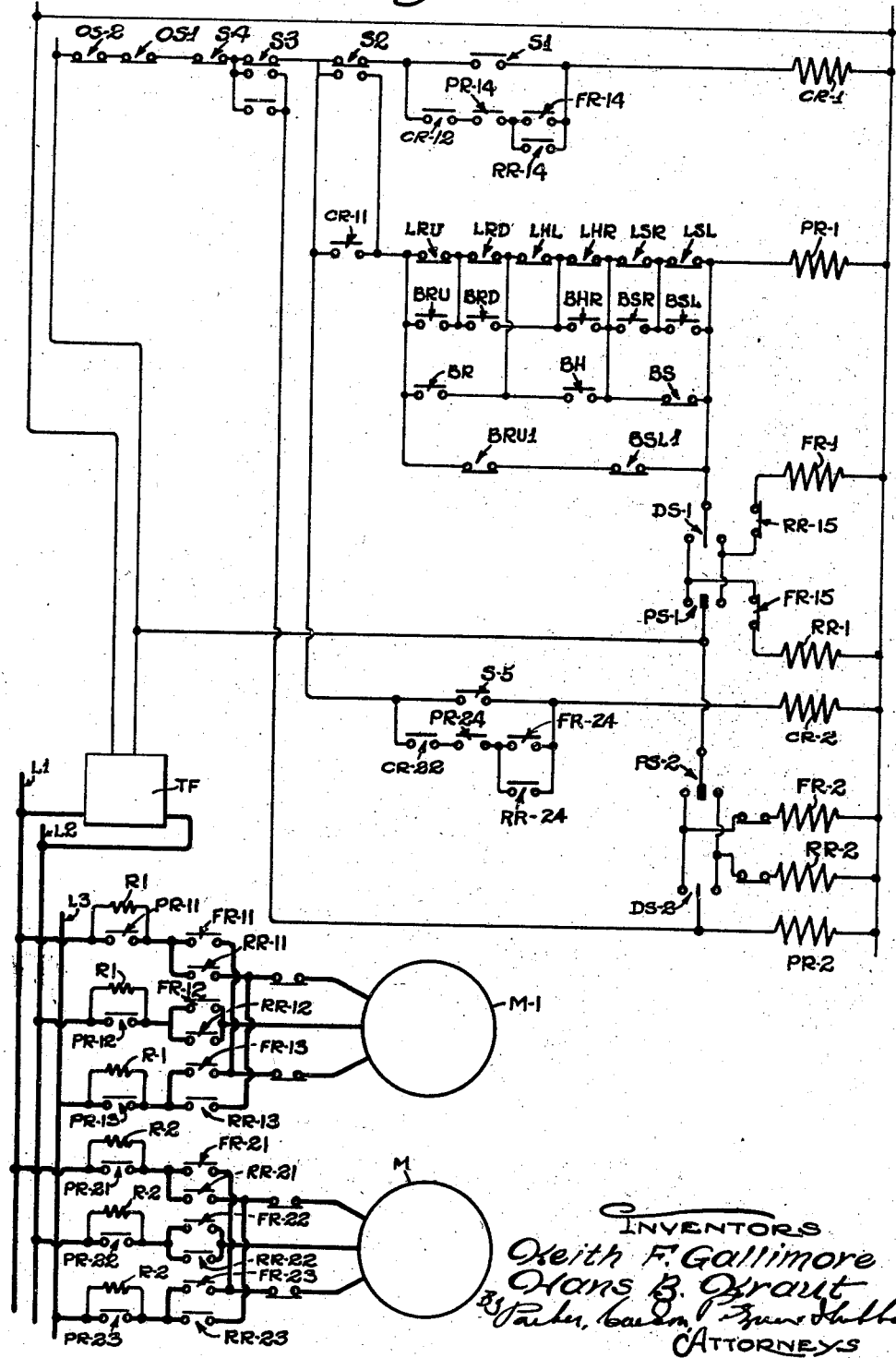

Patented May 21, 1946

2,400,819

UNITED STATES PATENT OFFICE 2,400,819

MACHINE TOOL

Keith F. Gallimore and Hans B. Kraut, Fond du Lac, Wis., assignors to Giddings & Lewis Machine Tool Co., Fond du Lac, Wis., a corporation of Wisconsin Application July 14, 1943, Serial No. 494,594

22 Claims. (Cl. 29—26)

The invention relates to machine tools and particularly to the class of machines commonly known as horizontal boring, drilling and milling machines.

One general object of the invention is to provide an improved machine of the class indicated which by reason of its flexibility and great versatility is universally applicable for performing a wide variety of machining operations including both horizontal and vertical plain boring, jig boring, drilling and milling.

Another object is to provide a machine tool in which the feed and drive mechanisms are organized in a novel manner so that the speed and direction of movement of the various machine elements may be effectively coordinated and controlled to facilitate the performance of the various machining operations above mentioned.

Another object is to provide improved measuring apparatus in a machine tool of the above general character so constructed and arranged that the tool supporting elements may be shifted and accurately positioned for operating on selected areas of the work while the same is set up in the machine.

A further object is to provide a boring, drilling and milling machine having both horizontal and vertical spindle headstocks which are independently adjustable to adapt them for a wide variety of working conditions and which are adapted for operation either alone or together as desired.

Still another object resides in the provision of novel interlocking control means for effectually preventing simultaneous translation of parts which might interfere with each other's movements.

Other objects and advantages of the invention will become apparent from the following detailed description of the preferred embodiment illustrated in the accompanying drawings in which:

Fig. 2 is a plan view of the machine.

Fig. 3 is an end elevational view of the machine.

Fig. 4 is a sectional view of the cross-rail supporting and guiding structure taken in a horizontal plane substantially on the line 4—4 of Fig. 1.

Fig. 5 is a sectional view through the cross-rail taken in a horizontal plane substantially on the line 5—5 of Fig. 1.

Fig. 6 is a fragmentary plan view of the cross-rail showing the manner of supporting it on a tailstock column.

Fig. 7 is a transverse sectional view through the cross-rail taken in a vertical plane substantially on the line 7—7 of Fig. 6.

Fig. 8 is a front view of the measuring device or micrometer gauge shown in Fig. 7.

Fig. 9 is an enlarged fragmentary front elevation of the machine showing a part of the control mechanism.

Fig. 10 is a transverse sectional view through the headstock column base taken in a vertical plane substantially on the line 10—10 of Fig. 9.

Fig. 11 is a sectional view taken in a vertical plane substantially on the line 11—11 of Fig. 9.

Fig. 13 is a diagrammatic layout of the drive and feed mechanisms of the machine.

Fig. 14 is a diagrammatic representation of the electrical control circuit of the machine.

Figure 1:
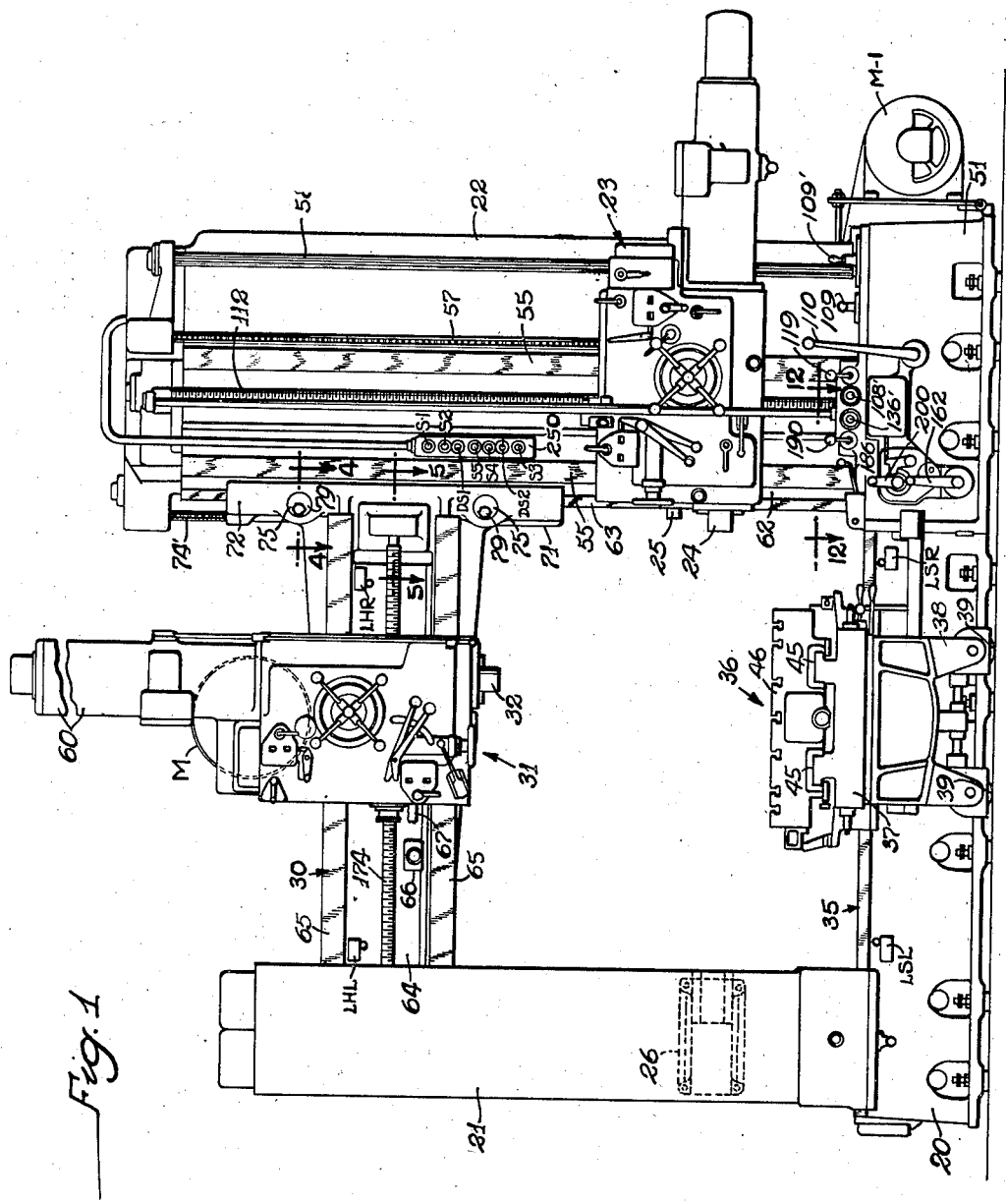
Figure 1 is a front elevational view of a machine tool embodying the features of the invention.

While the invention is susceptible of various modifications and alternative constructions, we have shown in the drawings and will herein describe in detail the preferred embodiment, but it is to be understood that we do not thereby intend to limit the invention to the specific form disclosed but intend to cover all modifications and alternative constructions falling within the spirit and scope of the invention as expressed in the appended claims.

By way of illustration, the invention has been shown and described herein as embodied in a machine of the general class commonly known as horizontal boring, drilling and milling machines. The improved machine, in addition to having the usual horizontal spindle headstock, is also provided with a vertical spindle headstock which is mounted for horizontal adjustment upon a vertically adjustable cross-rail. The improved machine is therefore adapted to perform all the machine operations ordinarily performed by conventional horizontal machines and for additional machining operations such as vertical boring, drilling and milling which may be performed simultaneously with or independently of the horizontal machining operations. Moreover, the machine may be provided with measuring instruments which enable the movements of the various tool and work supporting elements of the machine to be measured with a high degree of precision thus enabling the tools and work to be relatively shifted and positioned accurately for a series of operations on selected areas of the work. This latter feature is particularly advantageous in "jig boring" which involves the precise location of a plurality of holes on accurately determined center-to-center distances without preliminary measurements or laying out.

General machine organization

Referring to the drawings, the machine selected to illustrate the invention comprises generally an elongated horizontal bed 20 having an end support or tailstock column 21 at one end and a headstock column 22 at the other end. The latter column supports a vertically adjustable headstock 23 equipped with a main tool-carrying spindle 24 and an auxiliary spindle 25, both disposed horizontally and projecting on the side facing the tailstock column. On the column 21 is mounted a vertically adjustable end block or tailstock 26 which cooperates in well-known manner with the spindle 24 in supporting a boring bar (not shown) or similar elongated tool member. The columns 21 and 22 additionally support a vertically adjustable cross-rail 30 carrying a horizontally adjustable headstock 31 which has a vertically disposed tool spindle 32 projecting from its lower end.

As herein shown, the bed 20 is provided on its upper face with longitudinal ways 35 for adjustably supporting a carriage 36 adapted to present work to the tools carried by the spindles 24, 25 and 32. Preferably the carriage comprises a saddle 37 slidable on the ways 35 and having its overhanging ends supported by depending brackets 38 equipped with rollers 39 engaging rails 40 disposed on opposite sides of the bed. The top of the saddle 37 is formed with spaced parallel ways 45 on which a work table 46 is supported for movement transversely of the machine bed.

The headstock column 22 is supported in this instance upon a frame or base 51 bolted or otherwise rigidly secured to one end of the bed 20. The base is preferably in the form of a hollow, generally rectangular casting and serves as a housing for the transmission and control mechanisms utilized in translating the saddle 37, the table 46, the cross-rail 30 and the headstocks 23 and 31.

The column 22 embodies novel features of construction which enable it to support both the headstock 23 and one end of the cross-rail 30 so that either of these machine elements may be adjusted through its full range without interfering with the other element. In its preferred form, the column comprises an elongated hollow casting having spaced parallel ways 55 on its front wall or face for supporting and guiding the headstock 23. The weight of the headstock is counterbalanced by a weight 56 (Fig. 2) connected thereto by a chain 57 running over suitable pulleys journaled at the top of the column.

The drive for the headstock spindle 24, in this instance, is taken from a vertical spline shaft 58 which extends through the headstock for all positions of the latter and the lower end of which extends into the column base 51 for connection with the transmission mechanism enclosed therein as will appear presently. The headstock itself may be of any preferred character, that shown being the type disclosed in the Gallimore Patent No. 1,858,491, issued May 17, 1932. As is wellknown, suitable gearing and clutch means is provided in the headstock for conditioning the shaft 58 to rotate the spindles 24 and 25 and to feed them axially.

The headstock 31 carried by the cross-rail 30 is similar, in general, to the headstock 23. In the exemplary machine, however, a motor M is mounted directly on the headstock for rotating and translating the spindle 32. Moreover, since the spindle is arranged for vertical translation, it is desirable to counterbalance its weight. For this purpose a counterweight 59 (Fig. 3) slidably supported within the spindle housing 60 is operatively connected with the spindle by a flexible member or chain 61 running over sprocket wheels supported at the upper end of the housing.

For supporting and guiding the headstock end of the cross-rail 30, the column 22 is provided with a second guideway located in an advantageous manner so that both the cross-rail and the horizontal headstock 23 may be adjusted through their full ranges of travel without interfering with each other and without interfering with the operation of the tool spindles of the two headstocks. As herein shown, the second guideway is on the inner side wall of the column 22 and is disposed substantially at right angles to the ways 55 which support and guide the horizontal headstock 23 on the face of the column. For this purpose, the said inner side wall of the column is formed with a pair of laterally spaced vertically disposed ribs 62 projecting outwardly a substantial distance from the column as shown in Fig. 5. The ribs 62 are flanged along their outer edges and the flanges are suitably machined to provide parallel ways 63 of the dovetail type.

The cross-rail 30 in its preferred form comprises an elongated rail or body member 64 of generally rectangular cross section throughout its length and having its top, bottom and rear walls tapered gradually toward the tailstock end to provide maximum strength and rigidity with a minimum of weight. Horizontally disposed parallel ways 65 on the front face of the rail support and guide the headstock 31 for adjustment longitudinally of the rail, that is, transversely of the carriage 36.

For accurately locating the headstock 31 on the ways 65, a gauging device 66 (Figs. 1, 7 and 8) is mounted on the rail for coaction with a locating pin 67 carried by the headstock. The gauging device may be of any suitable type, such as herein a dial type micrometer gauge and, as herein shown, is supported by a bracket 68 on a guide rail 69 for adjustment longitudinally of the rail. When the machine is initially set up for an operation, the gauge and headstock are adjusted for a selected reference point and thereafter, any movements of the headstock relative to such reference point may be accurately measured.

To support the cross-rail 30 with the rigidity required for precision machining operations, the cross-rail is provided with relatively long bearing or guide surfaces 70 for coaction with the outer faces of the ways 63 on the headstock column 22. As herein shown, the guide surfaces 70 are formed on a flat, generally rectangular end section 71 integral with or rigidly secured to the large end of the rail member 63 and extending a substantial distance above and below the upper and lower edges of the member as shown in Figs. 1 and 3. The outer face of the end section is disposed in a plane substantially perpendicular to the longitudinal axis of the rail and the vertical guide surfaces 70 extend the full length of the section for coaction with the outer faces of the ways 63 on the headstock column. A flange 72 along one side edge of the end section projects over the adjacent way 63 while an inclined locking plate 73, bolted or otherwise removably secured to the other side edge of the end section, projects over the other way 63. The long guide surfaces 70 and the correspondingly long flange 72 and locking plate 73 are thus effective to hold the cross-rail securely against any twisting or lateral shifting on the guideway and to provide extremely firm and rigid support while permitting easy and accurate adjustment of the same.

To facilitate adjustment, the weight of the cross-rail is counterbalanced by a counterweight 74 (Fig. 2) enclosed within the headstock column and operatively connected with the rail by a flexible member such as a chain 74' running over suitable pulleys journaled on the top of the column. In the present instance, the counterweight 74 is shaped and dimensioned to fit within a vertical well 75' (Fig. 2) in the headstock column disposed alongside of and parallel to a similar vertical well 76' provided for the reception of the headstock counterweight 56. The counterweight wells 75' and 76' are defined, in this instance by a vertical web 77' within the column 22 which not only serves to prevent interference between the two counterweights but also materially strengthens the column.

Provision is made for clamping the cross-rail rigidly in adjusted position on the ways 63 when it is to remain stationary during a machining operation. Preferably two clamping mechanisms are installed on the end section 71 and the mechanisms are spaced apart vertically so as to grip the ways above and below the cross-rail and thus provide a firm anchorage for the rail. As the mechanisms are alike in this instance, a description of one will suffice.

Referring to Fig. 4, each of the rail clamping mechanisms comprises a pair of movable clamping members 75 and 76 disposed on opposite sides of one of the ways 63. The member 76 is mounted in a groove or slot formed in the face of the rail end section 71 while the clamping member 75, herein shown as a cylindrical plug, is slidably fitted in a recess in the flange 72 thus permitting the members to move only laterally of the rail or toward and from the way 63. A V-notch formed in one side of the member 75 facing the way 63 is adapted to fit over the tapered outer edge of the way. The companion clamping member 76 is formed with a laterally projecting shoulder 77 in opposed relation to the notch in the member 75 and positioned to engage a guide surface on the way 63 disposed substantially perpendicular to the outer face of the way.

When the rail is to be locked in adjusted position, the members 75 and 76 are drawn together into clamping engagement with the way 63 by means of a manually operable clamping screw or shaft 78. The shaft is extended through alined apertures in the clamping members and the rail structure with its ends projecting at the front and rear of the rail. The projecting ends are fitted with nuts 79 and 80 shaped for the reception of a wrench or other suitable tool whereby the shaft may be rotated. As herein shown, the nuts are splined to the shaft to provide adequate contact therebetween and both are pinned or otherwise secured thereto against endwise movement.

The end section of the shaft entering the clamping members are of reduced diameter and the intermediate portion thereof is threaded into the clamping member 75, as shown in Fig. 4. An abutment or shoulder 81 defined by the reduced end section of the shaft acts to limit the movement of the clamping member 76 longitudinally of the shaft. Accordingly, rotation of the shaft in one direction is effective to shift the member 75 toward the member 76 or in other words to draw these members together and thus rigidly clamp the rail to the ways. Rotation of the shaft in the other direction acts to shift the member 75 outwardly from the way and thus free the rail for movement on the ways. A thrust bearing 82, preferably of the anti-friction type, may be interposed between the shoulder 81 and the adjacent face of the clamping member 76 to prevent the shaft from binding.

In order to equalize the clamping pressure exerted by the clamping members 75 and 76 and to provide clearance between the latter member and the way when the clamping mechanism is released, the shaft is mounted for limited endwise floating movement. To this end the shaft is held in place by a split retaining plate 83 rigidly secured to the locking plate 73 and adapted to engage in a peripheral groove in the nut 80. The groove is slightly wider than the thickness of the retaining plate thus permitting limited endwise movement of the shaft. Upon release of the clamping members, a slight movement of the shaft and clamping member 76 to the left (as viewed in Fig. 4) is permitted thus withdrawing the latter from engagement with the way.

Novel means is provided for supporting and guiding the tailstock end of the cross-rail 30 on the end column 21 so that it may be leveled up accurately after the headstock end has been clamped in an adjusted position. The supporting means, as shown in Figs. 3, 6 and 7, includes a support block having interconnected, relatively adjustable front and rear sections 85 and 86. The front section 85 preferably comprises a generally rectangular casting adapted to be adjustably mounted on suitable guide surfaces on ways on the end column 21 as shown in Fig. 6. The section may be readily clamped in adjusted position by T-bolts 87 engaging in vertical T-slots in the column.

The rear section 86 of the support block also comprises a generally rectangular casting and has a channel-shaped recess in its rear face dimensioned to fit over and slidably engage the ways 65 of the cross-rail. Locking plates 88 detachably mounted on the section 86 extend over the rear faces of the ways to hold the section rigidly in adjusted position thereon.

To provide an adjustable connection between the sections 85 and 86, the latter section is formed with a pair of forwardly projecting lugs 89 spaced apart vertically to straddle an integral extension 90 of the front section 85. Adjusting screws 91 threaded into bushings 92 rigidly anchored in recesses in the lugs 89 engage hardened buttons 93 on the upper and lower faces of the extension 90 to hold the sections in fixed vertical relation.

Sufficient clearance is provided between the lugs 39 and the adjacent faces of the extension 90 so that the support section 86 may be shifted slightly either up or down after the front section 85 has been clamped in fixed position on the end column. This adjustment is effected by backing off one of the screws 91 and turning up the companion screw a like amount. As the rear support section is rigidly secured to the cross rail, the end portion of the rail is correspondingly shifted and can thus be leveled up with a high degree of precision. To take the strain off of the adjusting screws 91, the support sections may be rigidly clamped together after adjustment by locking screws 94' extending through slots in the rear section and threading into the front section.

Translation of the various machine elements may be effected either manually or through the medium of simple compact power transmissions and feed mechanisms enclosed within the column base 51. In the exemplary machine the drive for each of the machine elements is taken from a main drive shaft 94 (Fig. 13) suitably journaled in the column base. The main shaft is arranged to be driven in one direction only at either rapid traverse or feed rates, the latter being variable within wide limits to adapt the machine for the efficient performance of boring, drilling, and milling operations. The feed rates are determined by a speed change gear mechanism or milling feed unit 95 having a variable speed outlet shaft 96 adapted to be drivingly coupled with the main shaft 94 by gears 97 and a clutch 98.

For rapid traverse drive, the shaft 94 is coupled with a rapid traverse shaft 99 by means of a clutch 100, preferably of the friction type. The rapid traverse shaft is drivingly connected by gears 101 with a shaft 102 which, in this instance, constitutes the inlet shaft of the milling feed unit. The shaft 102 is driven from a power shaft 103 through gears 104, shaft 105, a unidirectional drive unit 106, and gears 107. A reversible electric motor M—1 is arranged to drive the shaft 103 through a multiple V-belt connection B, as shown in Fig. 13.

In the particular machine organization illustrated, a direct driving connection is provided by bevel gears 108 between the power shaft 103 and the vertical spline shaft 58 which transmits power to the headstock 23. As the motor M—1 is reversible, the direction of rotation of the spline shaft and consequently the direction of rotation and translation of the spindles 24 and 25 may be readily controlled through manipulation of the electric switching mechanism controlling the direction of rotation of the motor. Due to the presence of the unidirectional drive unit 106 in the connection between the power shaft 103 and the main shaft 94, the latter is always driven in one direction regardless of the direction of rotation of the power shaft.

The operation of the milling feed unit 95 may be controlled in well-known manner by means of hand levers 109 and 109' mounted on the column base, as shown in Fig. 1. Another hand lever 110 pivotally supported on the front wall of the column base is provided for actuating the feed and rapid traverse clutches 98 and 100. It will be understood of course that both of these clutches may be disengaged when desired to stop the main drive shaft without interrupting the transmission of power to the headstock 23.

The driving connection between the main shaft 94 and the feed mechanisms for the various machine elements will be readily seen by reference to Fig. 13 of the drawings. Thus the mechanism for translating the horizontal headstock 23 comprises a nut 111 rigidly mounted on the headstock casing and a vertical feed screw 112 threaded into the nut and extending to the top of the column 22 where it is rotatably anchored in a suitable bearing. The lower end of the screw extends through a bearing 112' (Fig. 10) in the upper part of the column base 51 and is drivingly connected by bevel gears 113 and 113' with an intermediate shaft 114 journaled in the base. Loosely mounted on the shaft 114 are spur gears 115 and 116 (Figs. 12 and 13) adapted to be drivingly coupled with the shaft alternately by a central clutch member or sleeve 117 splined to the shaft and slidable endwise from a neutral or disengaged position into engagement with either gear.

The gear 115 meshes directly with a pinion 115' keyed to the main shaft 94 while the gear 116 is driven by a pinion 116' on the main shaft through an idler gear 118. Thus when the main shaft is driven, the gears 115 and 116 are rotated in opposite directions and the feed screw can therefore be driven in a direction to move the headstock either up or down by appropriate shifting of the clutch member 117. Alternatively, the clutch member may be set in the central or neutral position to disengage both gears from the intermediate shaft and thus interrupt the drive for the headstock. A hand lever 119 (Figs. 1 and 9), accessible at the front of the machine, is utilized for shifting the clutch member.

The feed screw 112 may also be rotated manually for fine adjustment of the horizontal headstock 23. The means provided for such adjustment includes a shaft 105' (Figs. 12 and 13) journaled in the column base 51 and having a bevel gear 106' on its inner end meshing with the gear 113 on the feed screw. At its forward end, the shaft 105' is connected by spur gears 107' with a shaft 108' projecting at the front of the column base. The shaft 108' may be turned by a hand crank or other manually operable device.

For translating the table 46, a spline shaft 120 alined axially with the main shaft 94 and drivingly connected therewith by a coupling member 120' is arranged longitudinally of the machine bed between the ways 35. The shaft 120 has a splined driving connection with a helical gear 121 rotatably anchored in the saddle 37, the gear constituting the driven element of a reversing transmission 122. The transmission 122 may be of any preferred type and has an outlet shaft 123 drivingly connected by gears 124 with a nut 125 rotatably anchored in the saddle. The nut is threaded on a screw 126 disposed below the table 46 and rigidly secured thereto at each end. Thus when the main shaft is rotating, the table may be fed either forwardly or rearwardly, or it may be stopped in any selected position by appropriate setting of the transmission 122.

For traversing the cross rail 30, the vertical headstock 31, and the saddle 37, an auxiliary drive shaft 132 is interposed between the main shaft 94 and the individual drive mechanisms of the respective machine elements. The shaft 132 is rotatably supported in the base 51 substantially parallel to the main shaft and is arranged to be driven therefrom selectively in either a forward or reverse direction. For this purpose one driving gear 133 loosely mounted on the shaft is positioned for direct engagement with the pinion 116' on the main shaft. A second gear 134, also loosely mounted on the shaft 132, meshes with an idler gear 135 driven by a pinion 136 keyed to the main shaft. It will be apparent therefore that the gears 133 and 134 are driven in opposite directions. Selective coupling of the shaft 132 with either of the driving gears 133 and 134 is effected by a clutch member in the form of a sleeve 137 splined to the shaft and shiftable axially thereon from a neutral or disengaged position into engagement with either gear.

The auxiliary drive shaft 132 may also be rotated manually to effect fine adjustments of the machine elements associated therewith. To this end, a bevel gear 132' (Figs. 12 and 13) keyed to the end of the shaft is arranged to mesh with a bevel gear 133' fast on one end of a sleeve 134' rotatably supported on the adjusting shaft 105'. The sleeve is connected by spur gears 135' with a shaft 136' which projects at the front of the column base 51 for the attachment of a hand crank or other suitable manipulating element.

Alined axially with the shaft 132 is a short intermediate shaft 138 (Figs. 12 and 13) drivingly connected by a coupling member 139 with a feed screw 140 extending longitudinally of the machine bed parallel to the spline shaft 120. The feed screw is rotatably anchored in the bed and threaded through a nut 141 fixed on the saddle.

Provision is made for connecting the shaft 138 with the auxiliary shaft 132 either directly or through a speed reduction unit 142 which may be of any preferred type. The particular unit illustrated in Figs. 10 and 13 is of the sun and planet gear type comprising a spider 143 in the form of a gear supported for rotation about a fixed shaft 144. A pinion 145 fast on the shaft 132 drives the spider. Rotatably mounted on one face of the spider are a series of wide faced planet gears 146, each extending over and coacting with a stationary gear 147 fast on the shaft 144 and a gear 148 keyed to a rotatably supported shaft 149. The latter shaft has a pinion 150 arranged to drive a gear 151 loosely mounted on the shaft 138. Gears 147 and 148 are formed with different numbers of teeth and consequently when the spider 143 is rotated, the planet gears 146 operate to drive the gear 148 and shaft 149 at a greatly reduced rate.

A clutch member or sleeve 152 splined to the shaft 138 constitutes the means for connecting the shaft for either direct or indirect drive from the shaft 132. For this purpose the clutch member is formed with clutch teeth at each end and is shiftable from a neutral or disengaged position to engage clutch teeth formed in the hubs of the gears 145 and 151.

It will be apparent that the rate of movement of the saddle is governed by the position of the clutch member 152, while the direction of movement is governed by the position of the clutch member 137. The position of the latter member also determines the direction of movement of the rail 30 and the vertical headstock 31, as will appear presently. While the drives for each of these elements is subject to modification by other controls, the arrangement is such that the engagement of the clutch member 137 with the gear 134 results in rotation of the shaft 132 in a direction effective to move the headstock 31 and saddle 37 to the right, and to move the rail 30 upwardly, as viewed in Fig. 1. Reverse movement of these elements is obtained by engagement of the clutch member 137 with the gear 133.

The drive for the rail 30 and headstock 31 is taken directly from the clutch member 137 through gear teeth 155 formed thereon and meshing with a gear 156 fast on a shaft 157. Bevel gears 158 (Figs. 10 and 13) connect the shaft 157 with a shaft 159 which constitutes the inlet shaft of a variable speed mechanism 160 (Figs. 2, 11, and 13) herein shown as mounted at the rear of the column base 51. An outlet shaft 161 extends forwardly from the speed change mechanism below the ways 63 supporting the head end of the rail 30.

The speed change mechanism is adjusted to vary the rate of rotation of the outlet shaft by means of a hand lever 162 (Figs. 1 and 10) fixed on the outer end of a rock shaft 163 (Figs. 10 and 11) which extends forwardly from the speed change mechanism and projects at the front of the column base. A locking pin 164 slidably mounted on the hand lever engages in recesses in the front wall of the base to hold the lever in adjusted position, the pin being retractable from the recess by means of a finger lever 165 pivoted on the lever 162.

Axially alined with the shaft 161 is a stub shaft 166 suitably journaled in the column base, as shown in Fig. 11, and having a bevel gear 167 meshing with a bevel gear 168 keyed to the lower end of a feed screw 169 extending vertically along the column 22 between the ways 63. The feed screw is rotatably anchored at its upper and lower ends in suitable bearings carried on the column base and the column respectively, and is threaded through a nut 170 (Fig. 13) fixed to the rail. Rotation of the feed screw is therefore effective to shift the rail either up or down on the ways 63.

Loosely mounted on the shaft 161 is a bevel gear 171 meshing with a bevel gear 172 keyed to the lower end of a spline shaft 173 extending between the ways 63 parallel to the feed screw 169. The shaft 173 is operative in all positions of the rail 30 to drive a feed screw 174 extending longitudinally of the rail between the headstock ways 65 and threading into a fixed nut 175 on the headstock 31. The driving connection between the shaft 173 and the feed screw, as shown in Figs. 5 and 13, includes a bevel gear 176 having a splined driving connection with the shaft, a bevel 177 meshing with the gear 176, and a train of spur gears 178 all suitably journaled in a gear case 179 formed in the rail structure.

Means is provided for drivingly connecting the shaft 161 selectively with either the spline shaft driving gear 171 or the feed screw driving shaft 166. This means preferably comprises a clutch member in the form of a sleeve 180 splined to the shaft 161 and slidable thereon from a neutral position into engagement either with clutch teeth formed on the hub of the gear 171 or with clutch teeth formed in the face of a flange 181 integral with the shaft 166.

For shifting the clutch member 180, a shoe 182 (Fig. 11) is arranged to slide on horizontal guide rods 178 supported in the column base at one side of the shaft 161. The shoe is operatively connected by a pivoted link 184 with a shifter rod 185 extending toward the front of the column base and slidable endwise therein. A hand lever 186 (Figs. 1, 9, and 12) pivoted on the column base and operatively connected with the rod 185 is operative to shift the rod and shoe 182. The shifting mechanism is held in adjusted position by a spring pressed detent 187 engaging in spaced notches 188 in the shifter rod. As will be seen by reference to Fig. 11, three such notches are provided, namely, one for the neutral position, one for the rail feed position, and the third for the headstock feed position.

The shifting of the clutch member 137 to select the direction of movement of the rail 30, headstock 31, or saddle 37, as the case may be, is effected by a selector lever 190 (Figs. 1, 10, and 12) pivoted on the column base at the front of the machine. The inner end of the lever is operatively connected through a pivoted link 191 with a clutch shifter shoe 192. The shoe, in this instance, is secured to a rod 193 supported in the column base for endwise sliding movement parallel to the shaft 132 on which the clutch member 137 is mounted. The shoe and rod accordingly move together when the selector lever is rocked about its pivot, the shoe acting to position the clutch member while the rod performs additional control functions to be described hereinafter.

As previously explained, the shaft 132 is also arranged to drive the saddle feed screw either directly or through the speed change mechanism 142 under control of a clutch member 152. For shifting this clutch member to selectively engage either drive, or to interrupt the drive for the screw, a control lever 200 (Figs. 1, 9, 10 and 12) is provided at the front of the column base. As shown in Fig. 10 the lever 200 is fixed on the outer end of a horizontal rock shaft 201 rotatably supported in a tubular member or sleeve 202 journaled in the column base. An eccentric pin 203 on the inner end of the shaft operates when the shaft is rocked to actuate a shifter shoe 204 slidably supported on a horizontal guide rod 205 and operatively associated with the clutch member 152. A retractable locking pin 204′ engaging in recesses in a locking plate 205′ rigidly secured to the front wall of the column base acts to hold the control lever in any one of its three adjusted positions.

Figure 12:
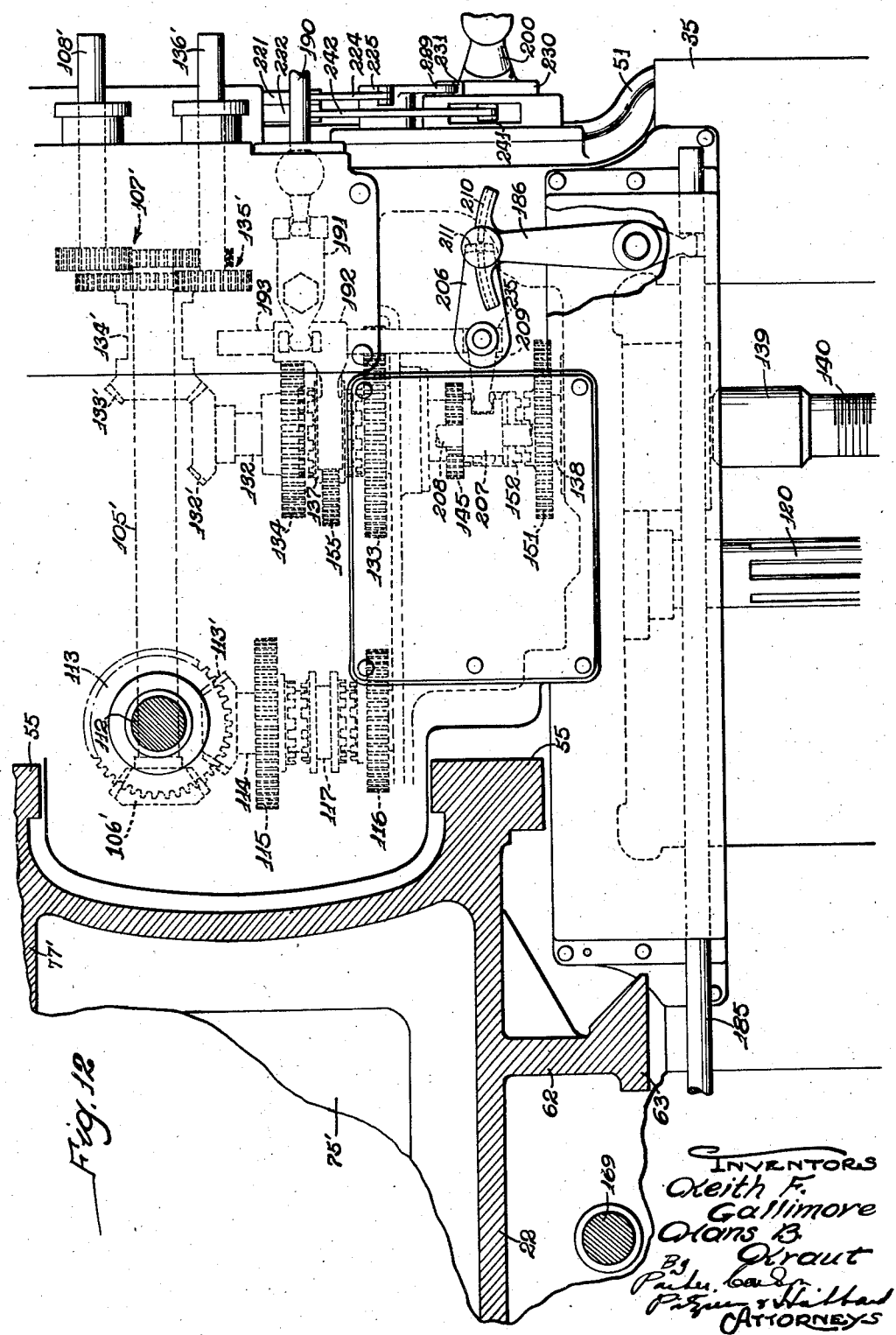
Fig. 12 is a sectional view taken in a horizontal plane substantially on the line 12—12 of Fig. 1.

To avoid any possibility of damage to the machine or to the work being operated on, novel means is provided for interlocking the saddle feed clutch actuating mechanism and actuating mechanism for the rail and vertical headstock feed clutch so that the saddle cannot be translated when either the rail or the head is in motion nor can either of the latter elements be translated when the saddle is in motion. The interlocking means as shown in Figs. 9, 10 and 12, comprises a bell crank pivotally supported on the base 51 and having one arm 206 adapted to swing in a plane below and parallel to the plane in which the control lever 186 moves. Movements of the clutch member 152 are transmitted to the bell crank by a shoe 207 (Figs. 10 and 12) supported for movement with the member by a guide rod 208. The shoe is suitably notched for engagement with the other arm 209 of the bell crank.

On adjacent faces of the control lever 186 and crank arm 206 are interlocking elements 210 and 211 in the form of relatively narrow upstanding ribs arcuate about the pivotal axes of their respective members. The rib for each member is formed with a central notch adapted to receive the other rib when the member is in the neutral or central position. Thus, when the crank arm 206 is in the central position corresponding to the neutral or disengaged position of the clutch member 152, the control lever 186 may be rocked in either direction to shift the clutch member 180 to either of its two engaged positions. In this movement of the control lever, the rib 210 traverses the notch in the rib 211 (see Fig. 9) and the notch in the first-mentioned rib is moved out of registration with the latter rib. As a result crank arm 206 is positively locked in the neutral position while the control lever is in engaged position. Engagement of the clutch 152 for driving the saddle is thus effectively prevented.

Conversely, when the control lever is in neutral position, the crank arm 206 is free to rock in either direction incident to the shifting of the clutch member 152. In this movement of the crank arm, the rib 211 traverses the notch in the companion rib 210 (see Fig. 10) and moves into blocking relation with the latter rib. The control lever 186 is therefore positively locked in neutral position so that the clutch 180 cannot be engaged to drive either the rail or the vertical headstock when the clutch member 152 is engaged to drive the saddle in either direction.

In addition to the mechanical interlock above described, various interlocking and safety switches are incorporated in the electrical control circuit of the machine to properly coordinate and guard the movements of the different machine elements. The safety controls include limit switches arranged for actuation by the translatable machine elements and adapted to stop the main driving motor M1 when any element is moved to its extreme limit positions. Thus, limit switches LRU and LRD (Figs. 3 and 14) are mounted on the headstock column 22 for actuation by the rail 30 as it approaches the limits of its upward and downward travel respectively. Limit switches LHL and LHR (Figs. 1 and 14) mounted on the cross-rail 30 are positioned for actuation by the headstock 31 at the left and right hand limits of its travel. For cooperation with the saddle 37, limit switches LSL and LSR (Figs. 1 and 14) are mounted on the machine bed 20 for actuation alternately as the saddle approaches the left or right end of the ways 35.

The limit switches above referred to are all of the type having normally closed switch contacts through which a control circuit may be extended when the machine elements are located in other than their limit positions. Upon actuation, the switch contacts are opened to interrupt such control circuit and stop the main driving motor as will appear presently. In order to guard against interruptions due to accidental opening of the limit switches, means is provided for rendering the switches effective for control purposes only when their functioning is required for safe operation of the machine. Moreover, provision is made for by-passing the limit switches selectively so that the machine may be restarted by proper manipulation of the transmission control levers after a stoppage has been initiated by any limit switch.

The means utilized to condition the limit switches for performing their safety functions comprises a plurality of by-pass switches interconnected with the limit switches as shown in Fig. 14 and arranged for actuation in response to the shifting of certain of the control levers. Thus the direction control lever 190, when shifted to the right or "rail up, saddle right or headstock right" position, is operative to actuate one switch BRD for by-passing the "rail down" limit switch LRD and the "headstock left" limit switch LHL, and to actuate a second switch BSL for by-passing "saddle left" limit switch LSL. The transmission mechanism can therefore be operated to drive the headstock 31 or saddle 37 to the right or to drive the rail 30 upwardly. However, the open limit switch prevents operation of the transmissions in the event that the control levers are shifted in a direction such as to drive the elements in the opposite directions.

The direction control lever 190, when shifted to the left or "rail down, saddle left or headstock left" position actuates three by-pass switches. One switch BRU by-passes the upper rail limit switch LRU. A second switch BHR by-passes the "headstock right" limit switch LHR. A third switch BSR by-passes the "saddle right" limit switch LSR. Thus the transmission mechanism may be operated to lower the rail or to drive either the headstock or the saddle to the left irrespective of the setting of these limit switches.

As the rail 30 and headstock 31 are arranged to be driven alternately by a common clutch member 180, it will be evident that only the limit switches associated with one of these elements will be required to function for safety purposes at any given time. A switch BR is accordingly arranged to by-pass the rail limit switches LRU and LRD when the clutch member is engaged for driving the headstock. A similar switch BH is provided for by-passing the headstock limit switches LHL and LHR when the clutch member is engaged for driving the rail.

While the switches BR and BH may be of any suitable character, they are shown herein as switches of the open contact type. Referring to Fig. 11, the switches are conveniently mounted in a housing 215 within the column base 51 through which the clutch shifter rod 185 extends. Cams 216 and 217 fixed on the rod within the housing serve to actuate the switches selectively when the rod is shifted from its neutral position to either engaged position.

Referring to Fig. 14, it will be observed that switch BS having normally closed switch contacts is connected so as to establish a shunt circuit around the saddle limit switches LSL and LSR. Means is provided for actuating this switch to open the shunt circuit and thus condition the limit switches for performing their control function upon movement of the saddle feed control lever 200 from the neutral position to engage either the rapid or slow feed drive for the saddle as will appear presently.

In order to enable the main driving motor M—1 to operate when the clutch 137 is disengaged, two of the by-pass switches are equipped with normally closed auxiliary switch contacts adapted to establish a shunt circuit around all of the limit switches while the direction control lever 190 is in neutral position. The arrangement is such that upon movement of the control lever to either operated position, one of the switches is opened to interrupt the shunt circuit and thus condition the limit switches for operation as determined by the other by-pass switches hereinbefore described.

In the exemplary machine, the switches BRU and BSL are equipped with the auxiliary normally closed contact sets BRU1 and BSL1 respectively. As will be seen by reference to Fig. 14, these switches are connected in series across all of the by-pass switches so that the latter are ineffective to interrupt the operation of the main driving motor. It will be appreciated that as long as the direction control lever is in the neutral position no driving connection can be established for the rail 30, the headstock 31 or the saddle 37 because of the disengaged condition of the clutch member 137. The main driving motor may be operated, however, to drive the headstock 23.

As shown in Fig. 9, the six by-pass switches are mounted in two horizontal rows one above the other upon a panel 220 fixed on the front of the machine base. Slidably mounted in side-by-side relation for independent endwise movement between the rows of switches are a pair of switch actuating bars 221 and 222 (Fig. 12). The front bar 221 is utilized to actuate only the switch BS and for this purpose is provided with a cam member in the form of a cross piece 223 projecting laterally from the underside of the bar and positioned to engage the switch when the bar is shifted from the neutral position to the right as viewed in Fig. 9. The rear bar 222 is suitably notched in its lower edge to accommodate the cross piece 223 and additional notches in the upper and lower edges serve to actuate the other five by-pass switches. The latter notches are so positioned that movement of the bar to the right from the neutral position is effective to close the switches BRU, BHR and BSR and to open the switch BRU1. Upon movement of the bar to the left switches BRD and BSL are closed and switch BSL1 is opened.

The switch actuating bar 221 is adapted to be shifted to operated position in response to the movement of the saddle feed lever 200 to either the slow or rapid feed positions. To this end, the bar is connected by a link 224 with the free end of an arm 225 supported for pivotal movement on a shaft 226 journaled in a bearing 227 on the front wall of the column base. An extension 228 at one side of the arm terminates in a rounded nose portion or follower 229 positioned to coact with a generally circular cam 230 formed on the hub portion of the lever 200, the cam having a notch 231 which permits the arm 228 and bar 221 to move to the switch closing position under the action of a spring 232 when the lever occupies the upright or neutral position shown in Fig. 9.

For shifting the rear control bar 222 in response to actuation of the direction control lever 190, an operative connection is provided between the bar and the clutch shifter operated by the control lever. As shown in Fig. 10 the connection is effected through the medium of a notch formed at one end of the shifter guide rod 193 engaging the upper end of a rocker member 235. The member is pivotally supported intermediate its ends within the column base and below the guide rod by a pivot pin 236. At its lower end the rocker member carries a laterally projecting pin 237 engaging in a slot in an arm 238 projecting radially from a collar 239 pinned to the inner end of the sleeve 202 which, as previously explained, is journaled in the column base and through which the control lever shaft 201 extends.

By reason of the connection above described, the shifting of the clutch member 137 to establish the forward and reverse driving conections for the shaft 132 are reflected by a corresponding rocking of the sleeve 202. The movements of the sleeve are transmitted to the switch actuated bar by a collar 240 pinned to the outer end of the sleeve and having a radially projecting arm 241 connected by a link 242 with the bar.

As mentioned heretofore the limit switches are preferably interconnected in the electrical control circuit so as to enable them to stop the main driving motor M—1 when such action is required for the safety of the machine. Referring to the wiring diagram Fig. 14, current for operating both the main motor M—1 and the headstock motor M is supplied by way of a power line comprising conductors L—1, L—2 and L—3. The motor M—1 is connected to the line conductors for forward operation by switches FR—11, FR—12 and FR—13 adapted to be closed by a forward running relay FR—1. Switches RR—11, RR—12 and RR—13 of a reverse running relay RR—1 are adapted to connect the motor to the line for reverse operation. Interposed between each line conductor and the running switches is a resistance R—1 effective to reduce the voltage of the current applied to the motor. Switches PR—11, PR—12 and PR—13 controlled by a plugging relay PR—1 short circuit the resistances during normal operation of the motor.

The control connections for the motor M are similar to those above described for the motor M—1 comprising forward running switches FR—21, FR—22 and FR—23 and reverse running switches RR—21, RR—22 and RR—23 actuated respectively by relays FR—2 and RR—2. Voltage reducing resistance R—2 in each of the connecting lines are shunted during normal operation by switches PR—21, PR—22 and PR—23 actuated by a plugging relay PR—2.

The plugging and running relays together with control relays CR—1 and CR—2 are connected in a low voltage control circuit to which current is supplied from the main power line through a step-down transformer TF. When the machine is to be placed in operation, the motor M—1 is started by closure of a manually operable starting switch S—1. Closure of this switch completes an energizing circuit for relay CR—1, the circuit including a normally closed stop and inching switch S—2 for the motor M—1, a normally closed stop and inching switch S—3 for the motor M, an emergency stop switch S—4 for both motors, and overload switches OS—1 and OS—2 suitably connected with conventional overload mechanisms associated with the respective motors.

Control relay CR—1 when energized, closes a switch CR—11 to complete a starting circuit either by way of the series connected limit switches or through the by-pass circuits around such switches. One or the other of the running relays FR—1 or RR—1 is energized in this starting circuit. The particular relay to be energized is determined by a setting of a manually operable direction control switch DS—1. Thus when the right hand or "forward" contacts of the direction switch are closed, relay FR—1 is energized in response to actuation of the starting switch. On the other hand, relay RR—1 is energized by the starting switch when the left hand or "reverse" contacts of the direction switch are closed.

Simultaneously with the energization of the selected running relay, the plugging relay PR—1 is energized to shunt the resistances R—2 from the motor supply circuit. The relays CR—1 and PR—1 and the energized running relay, by closing switches CR—12, PR—14 and one or the other of the switches FR—14 or RR—14, complete a holding circuit for the control relay to maintain the relay energized independently of the starting switch. The motor M—1 therefore continues in operation until the holding circuit of the control relay is interrupted by the opening of one of the stop or overload switches or until the running relay circuit is interrupted by the opening of a limit switch which is not at that time shunted by a by-pass switch.

Upon opening of any of the circuit controlling switches above referred to, the motor M—1 is plugged to a stop at reduced voltage. The means for stopping the motor in this manner includes a conventional plugging switch PS—1 operably associated with the motor shaft in well-known manner. As herein shown, the plugging switch is arranged to close its left hand contacts when the motor is running in a forward direction and to close its right hand contacts when the motor is running in a reverse direction. The first-mentioned contacts, when closed, prepare a circuit for the relay RR—1 which circuit is interrupted however, by a switch FR—15 actuated by the relay FR—1 when energized. Similarly the right hand contacts of the plugging switch are included in a circuit for the relay FR—1 which circuit includes a switch RR—15 actuated by a relay RR—1 when energized.

It will be seen from the above that the de-energization of either running relay when the motor M—1 is in operation will result in the immediate energization of the other running relay. The current supply connections to the motor are thus reversed. As the plugging relay PR—1 is energized in parallel with the running relay selected by the direction switch DS—1, the said plugging relay will likewise become deenergized and open the shunt around the resistance R—1 to reduce the voltage of the current supplied to the motor during the interval of reverse current operation. As a result, the motor is brought to a quick stop without shock and without imposing excessive strains thereon. The plugging switch PS—1 of course, opens the running relay circuit in well-known manner as soon as the motor shaft is brought to a complete stop.

The control relay CR—2 for the headstock motor M is provided with starting and holding circuits similar in all respects to the circuits for the control relay CR—1. Thus the starting circuit includes a manually operably starting switch S—5 and the switches S—3, S—4, OS—1 and OS—2 previously described. The holding circuit includes a switch CR—22 actuated by the control relay, the switch PR—22 actuated by the plugging relay PR—2, and one of the other of the switches FR—24 or RR—24 actuated by the respective running relays.

A direction switch DS—2 is operable manually to select one or the other of the relays FR—2 or RR—2 for operation while a plugging switch PS—2 functions in the manner above described for the switch PS—1 in plugging the motor M to a stop.

While the various manually operable switches above referred to may be mounted in any suitable location, for the convenience of the machine attendant it is preferred to mount them on a pendant control panel 250 suspended from the top of the headstock column 22 as shown in Fig. 1. The switches like the various control levers are therefore all conveniently accessible to the attendant at a single station at the front of the machine.

It will be apparent from the foregoing that the invention provides a machine tool which is extremely flexible in operation and very versatile in regards the number of machining operations which can be performed efficiently thereon. The improved machine is similar in its general construction to the class of machines commonly known as horizontal boring, drilling and milling machines but includes additional features of construction which adapt it for the performance of vertical boring, drilling and milling simultaneously with the horizontal operations. Thus, a workpiece may be operated on from two sides simultaneously in a single setting which materially speeds up the machining operations.

The greater versatility has been attained, not by the mere installation of additional machine elements, but by the extensive and important changes in the machine structure to enable the operations of the different machine elements to be effectually coordinated while each element performs its functions with the greatest efficiency and accuracy. To this end, the headstock column has been constructed to provide vertical guideways for supporting a horizontal headstock and one end of a horizontal cross-rail for independent non-interfering adjustment.

The cross-rail, which provides support for a vertical headstock, is of light weight yet extremely rigid construction and is provided with guide means located advantageously for coaction with the ways on the headstock and tailstock columns of the machine whereby firm, vibrationless support is provided therefore. Clamping mechanism of improved construction embodied in the rail structure permits it to be rigidly clamped in adjusted position on the headstock column while novel adjustable supporting means at the other end of the rail is available for leveling up the same after the headstock end has been clamped in a fixed position.

Provision is made for driving the various translatable machine elements from a single motor through the medium of interconnected transmissions and control mechanisms housed within the headstock column base of the machine. The transmissions provide a wide variety of changes in feed speeds thus enabling the machine to be operated with great flexibility and enabling many different types of machine operations to be performed efficiently.

Manual controls for the transmissions are all conveniently centralized so that the speed as well as the direction of movement of any machine element may be easily and accurately controlled while the attendant maintains a close watch on the work. Moreover, the controls are effectually interlocked so that the machine elements cannot be moved into interfering relation and the movements of the elements are suitably guarded so that safe operation of the machine is insured at all times.

We claim as our invention:

1. In a machine tool of the class described, in combination, an elongated horizontal bed, a work support reciprocable on said bed, an upright column at one end of the bed, a first vertical guideway on the front face of said column, a second vertical guideway on the face of the column adjacent the work support, a headstock mounted for reciprocation on said first guideway, a rail slidably supported at one end on the second vertical guideway and extending over the work support, said rail having a horizontal guideway, and a headstock supported on said horizontal guideway for movement transversely of the work support.

2. In a machine tool of the class described, in combination, an elongated horizontal bed, an upright column at each end of the bed, a plurality of movable machine elements including a work support movable longitudinally of the bed, a headstock mounted on the front face of one of said columns for movement in a vertical plane, a cross-rail supported at one end on the side of said one column adjacent the work support and at the other end on the rear face of the other column for movement toward and from the work support, a headstock supported on said rail for movement in a horizontal plane, and power actuated means for shifting the movable machine elements.

3. In a machine tool of the class described, in combination, an elongated horizontal bed, a work support movable longitudinally of the bed, a plurality of headstocks, a cross-rail, an upright column at one end of the bed, ways on the front face of said column supporting and guiding one of said headstocks for movement in a vertical plane, ways on the side of said column supporting and guiding one end of the cross-rail for movement in a vertical plane, a column at the other end of the bed supporting the other end of the cross-rail, and ways on said cross-rail supporting and guiding the other of said headstocks for movement in a horizontal plane.

4. In a machine tool of the class described, in combination, an elongated horizontal bed, a work support movable longitudinally of the bed, an upright column at each end of the bed, a first headstock supported and guided on one of said columns for vertical adjustment, a cross-rail supported and guided at opposite ends on said columns for vertical adjustment, a second headstock supported and guided on said cross-rail for horizontal adjustment, individual feed mechanisms operable to translate said work support, said headstocks and said cross-rail, a power driven shaft, means providing a direct power transmitting connection between said shaft and said first headstock, and clutch means operable to provide power transmitting connections between said shaft and said feed mechanisms selectively.

5. In a machine tool having a plurality of translatable machine elements including, a work support, a rail extending over said work support and movable toward and from the same, a tool supporting headstock mounted on said rail for movement transversely of the work support, power driven feed mechanism for translating said machine elements, a control lever operable to engage the feed mechanism for driving the work support, a second control lever operable selectively to engage the feed mechanism for driving either the rail or the headstock, and coacting interlocking elements movable with said levers to prevent operation of either lever when the other is operated.

6. In a machine tool having a plurality of translatable machine elements including, a work support, a rail extending over said work support and movable toward and from the same, a tool supporting headstock mounted on said rail for movement transversely of the work support, power driven feed mechanisms for translating said machine elements, a control lever shiftable manually from a neutral position to either of two operated positions to engage the feed mechanism for driving the work support at either a slow or a rapid rate, a second control lever shiftable manually from a neutral position to either of two operated positions to engage the feed mechanisms for driving either the rail or the headstock, and mechanical interlocking means for preventing simultaneous movement of both levers.

7. In a machine tool having a plurality of translatable machine elements including, a work support, a rail extending over said work support and movable toward and from the same, a tool supporting headstock mounted on said rail for movement transversely of the work support, power driven feed mechanisms for translating said machine elements at feed or rapid traverse rates, a control lever movable from a neutral position to either of two operated positions to engage the feed mechanism for driving the work support at either a slow or a rapid rate, a second control lever movable from a neutral position to either of two operated positions to engage the feed mechanisms for driving either the rail or the headstock, and a third control lever operable to determine the direction of movement imparted to the machine elements by their respective feed mechanisms.

8. In a machine tool, in combination, an elongated horizontal bed, a work support translatable longitudinally of the bed, upright columns at each end of the bed, a cross-rail supported and guided on said columns for vertical adjustment, a headstock supported and guided on said cross-rail for horizontal adjustment, drive mechanism for adjusting said rail, drive mechanism for adjusting said headstock, a power driven shaft, a speed change mechanism having an inlet shaft and an outlet shaft, clutch means operable to drivingly couple said inlet shaft and said power driven shaft, and a single clutch member operable to connect said outlet shaft with either of said drive mechanisms.

9. In a machine of the class described, in combination, an elongated horizontal bed, a work support translatable on said bed, upright columns at each end of the bed, a first headstock supported and guided on one of said columns for vertical adjustment, a cross-rail supported and guided at opposite ends on said columns for vertical adjustment, a second headstock supported and guided on said rail for horizontal adjustment, individual feed mechanisms for driving said headstocks, said rail and said work support, a main drive shaft, a motor operative to drive said shaft in one direction, an intermediate shaft, clutch means operable selectively to connect said main shaft with said intermediate shaft for driving the latter in either a forward or a reverse direction, clutch means operable to establish a direct driving connection between the main shaft and the feed mechanism for said first headstock, and other clutch means operable selectively to establish driving connections between said intermediate shaft and the feed mechanisms for said second headstock, said rail and said work support.

10. In a machine of the class described, in combination, an elongated horizontal bed, a work support translatable on said bed, upright columns at each end of the bed, a first headstock supported and guided on one of said columns for vertical adjustment, a cross-rail supported and guided at opposite ends on said columns for vertical adjustment, a second headstock supported and guided on said cross-rail for horizontal adjustment, individual feed mechanisms for driving said headstocks, said cross-rail and said work support, a main drive shaft, a motor, a speed change gear unit, clutch means operable to connect said motor for driving said shaft in one direction either directly or through said unit, an intermediate shaft, clutch means operable to drivingly couple said main and intermediate shafts for driving the latter in either a forward or a reverse direction, clutch means operable selectively to connect said main shaft with the feed mechanism for said first headstock for driving the same either up or down, and other clutch means operable to connect said auxiliary shaft selectively with the feed mechanisms for the second headstock, the rail and the work support.

11. In a machine tool structure, an upright column comprising a hollow casting of generally rectangular cross-section, spaced vertical ways formed on one side of the column for supporting and guiding a translatable machine element, and spaced vertical ways formed on another side of the column adjacent said one side for supporting and guiding a second translatable machine element, said ways being located so as to permit translation of each element through its full range of movement without interfering with the translation of the other element.

12. In a machine tool structure, an upright column comprising a hollow casting of generally rectangular cross-section, spaced vertical ways formed on one side of the column for supporting and guiding a translatable machine element, and spaced vertical ways formed on another side of the column adjacent said one side for supporting and guiding a second translatable machine element, and means dividing the interior of the column vertically to provide two wells for the reception of counterweights operatively connected to the machine elements supported and guided on the respective ways.

13. In a machine tool of the class described, in combination, a horizontal bed, upright columns at each end of the bed, an elongated cross-rail extending over said bed, means supporting and guiding said cross-rail on said columns for vertical adjustment including vertical guide surfaces formed on one end of the cross-rail adapted to coact with vertical ways on one of said columns, a supporting block including a rear section secured to the face of the cross-rail adjacent the other end thereof, a front section adjustably mounted on the other of said columns and adapted to be rigidly clamped thereto, and means for adjusting one of said sections vertically with respect to the other section to raise or lower said other end of the cross-rail.

14. The combination with a cross-rail having horizontally disposed ways on one face, of means for supporting one end of the rail on an upright column comprising a block having a rear section adjustably mounted on said ways, a front section adapted to be rigidly clamped to said column, coacting means on the sections operable to adjust one section vertically with respect to the other, and means for rigidly clamping the sections together in adjusted relation.

15. The combination with a machine element supported and guided for movement on spaced parallel ways, means for rigidly clamping the element to the ways comprising, a pair of movable clamping members disposed on opposite sides of one of the ways and positioned for direct engagement therewith, a shaft extending through said members and having screw threaded engagement with one member, a shoulder on said shaft engageable with the other member to restrict movement of the same longitudinally of the shaft whereby the members may be drawn together into clamping engagement with the way by rotation of the shaft, said shaft having limited endwise movement relative to the machine element to equalize the clamping action of said members.

16. Mechanism for clamping a movable machine element to a supporting and guiding way comprising, in combination, a clamping member supported on the machine element at one side of the way for movement toward and from the same, a second member supported on the element at the opposite side of the way for movement toward and from the first member, a shaft supported on the machine element for rotation and for limited endwise movement, said shaft extending through both of said members and having a screw threaded connection with one of the members, and means on the shaft defining a shoulder engageable with the other member whereby the members may be drawn together into direct clamping engagement with the way by rotation of the shaft in one direction, the endwise movability of said shaft acting to equalize the clamping action of the members, said members being shifted apart and withdrawn from engagement with the way by rotation of the shaft in the other direction.

17. In a machine tool having a plurality of translatable elements including a horizontally reciprocable work support, a vertically reciprocable cross-rail and a headstock reciprocable longitudinally of the rail, the combination with a motor for driving the elements, control levers operable to connect the motor for driving any one of said elements selectively, a direction control lever operable to control the direction of movement of each element, a pair of limit switches associated with each element and adapted to be actuated alternately as the element approaches opposite ends of its travel, a control circuit for said motor including said limit switches connected in series, and switches actuated by the direction control lever for by-passing one limit switch of each pair to enable the motor to be started when the lever is set to drive a machine element away from any actuated limit switch.

18. In a machine tool having a plurality of translatable elements including a horizontally reciprocable work support, a vertically reciprocable cross-rail and a headstock reciprocable longitudinally of the rail, the combination of a motor for driving the elements, control levers operable to connect the motor for driving any one of said elements selectively, a direction control lever operable to control the direction of movement of each element, a pair of limit switches associated with each element and adapted to be actuated alternately as the element approaches opposite ends of its travel, a control circuit for said motor including said limit switches connected in series, and switches actuated by said control levers operative to by-pass all of the limit switches except those associated with the machine element being driven.

19. In a machine tool having a plurality of translatable elements including a work support, a cross-rail, and a headstock mounted on the cross-rail, the combination of a main drive shaft, a motor operable to drive said shaft in one direction, an intermediate shaft adapted to be drivingly connected with each of the machine elements selectively, a clutch member shiftable between a neutral position and two engaged positions in which the intermediate shaft is connected to the main shaft for forward and reverse drive, a pair of limit switches associated with each machine element and positioned to define the limit positions of the respective elements, said limit switches being connected in a control circuit for said motor, a first group of by-pass switches adapted when actuated to complete shunt circuits around one limit switch of each pair, a second group of limit switches adapted when actuated to complete shunt circuits around the other limit switch of each pair, and switch actuating means including an actuator bar shiftable with said clutch member.

20. In a machine tool having a plurality of translatable elements including a work support, a cross-rail and a headstock mounted on the cross-rail, the combination of a main drive shaft, a motor operable to drive said shaft in one direction, an intermediate shaft adapted to be drivingly connected with each of the machine elements selectively, a clutch member shiftable between a neutral position and two engaged positions in which the intermediate shaft is connected to the main shaft for forward and reverse drive, a pair of limit switches associated with each machine element and positioned to define the limit positions of the respective elements, said limit switches being connected in a control circuit for said motor, a first group of by-pass switches adapted when actuated to complete shunt circuits around one limit switch of each pair, a second group of limit switches adapted when actuated to complete shunt circuits around the other limit switch of each pair, a third group of by-pass switches adapted when actuated to complete a shunt circuit around all of said limit switches, and a switch actuator shiftable with said clutch member effective to actuate said first and second groups of switches when the clutch member is shifted to its respective engaged positions and to actuate said third group of switches when the clutch member is shifted to the neutral positions.

21. In a machine tool having a translatable machine element, in combination, feed mechanism for the machine element, a power driven shaft, a speed reducer driven from said shaft, a clutch having a neutral position and two engaged positions effective to connect said mechanism with said shaft either directly or through said feed mechanism, a pair of limit switches positioned for actuation by the machine element at opposite ends of its travel, a by-pass switch normally operative to establish a shunt circuit around said limit switches, and an actuator operative to actuate said by-pass switch and open said shunt circuit in response to the setting of said clutch in either engaged position.

22. In a machine tool having a translatable machine element, in combination, feed mechanism for the machine element, a power driven shaft, a speed reducer driven from said shaft, a control lever movable between a neutral position and two engaged positions, clutch means operative when said lever is moved to one engaged position to connect said mechanism directly with said shaft and operative when the control lever is moved to the other engaged position to connect said mechanism with said shaft through said speed reducer, a pair of limit switches defining the limit positions of the machine element, a by-pass switch normally effective to close a shunt circuit around said limit switches, an actuator member shiftable relative to said by-pass switch to actuate the same and thereby interrupt said shunt circuit, and cam means operable to shift said actuator member in response to the movement of the control lever to either engaged position.

KEITH F. GALLIMORE.
HANS B. KRAUT.